( 12 ) United States Patent
Audigier et al.

(10) Patent No.: US 9,174,493 B2
(45) Date of Patent: Nov. 3, 2015

(54) TIRE TREAD HAVING IMPROVED RIGIDITY

(75) Inventors: Richard Audigier, St-Laure (FR);
 Stéphane Oraison, Le Vernet (FR);
 Mathieu Vandaele,
 Charbonnieres-les-Varennes (FR); Gilles Douet, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE S.A., ( * ) Notice: Subject to any disclaimer, the term of this patent is extended or adjusted under 35 U.S.C. 154(b) by 889 days.

(21) Appl. No.: 13/497,324

(22) PCT Filed: Sep. 28, 2010

(86) PCT No.: PCT/EP2010/064375
 § 371 (c)(1),
 (2), (4) Date: May 31, 2012

(87) PCT Pub. No.: WO2011/039194
 PCT Pub. Date: Apr. 7, 2011

(65) Prior Publication Data
 US 2012/0227883 A1 Sep. 13, 2012

(30) Foreign Application Priority Data
 Sep. 29, 2009 (FR) ...................................... 09 56752

(51) Int. Cl.
 *B60C 11/13* (2006.01)
 *B60C 11/04* (2006.01)
 *B60C 11/03* (2006.01)
 *B60C 11/12* (2006.01)

(52) U.S. Cl.
 CPC ............. *B60C 11/042* (2013.04); *B60C 11/032* (2013.04); *B60C 11/0309* (2013.04); *B60C11/0323* (2013.04); *B60C 11/12* (2013.01); *B60C 11/1281* (2013.04); *B60C 11/1307* (2013.04)

(58) Field of Classification Search
 CPC ............ B60C 11/0323; B60C 11/0309; B60C 11/042; B60C 11/1353; B60C 11/13; B60C 11/1307; B60C 11/1281; B60C 11/0041; B60C 11/032; B60C 11/045; B60C 11/047; B60C 11/1218; B60C 11/1236; B60C 11/12; B60C 2011/133; B60C 2011/1227
 IPC ........................................................ B60C 11/13
 See application file for complete search history.

(56) References Cited

U.S. PATENT DOCUMENTS 4,703,787 A * 11/1987 Ghilardi ................... 152/209.21
5,275,218 A 1/1994 Nakayama et al.
(Continued)

FOREIGN PATENT DOCUMENTS

EP 0 335 694 A2 10/1989
FR 2 924 981 A1 6/2009
(Continued)

OTHER PUBLICATIONS

International Search Report (PCT/ISA/210) issued on Nov. 24, 2010, by European Patent Office as the International Searching Authority for International Application No. PCT/EP2010/064375.

*Primary Examiner* — Richard Crispino
*Assistant Examiner* — Philip N Schwartz
(74) *Attorney, Agent, or Firm* — Dickinson Wright PLLC (57) ABSTRACT

Tire tread having at least two wearing layers, provided with at least one continuous groove having in the as new condition a plurality of external cavities opening onto the tread surface and a plurality of internal cavities placed radially and completely inside the tread surface, such that: the difference between the mean lengths of the internal cavities and of the external cavities is at most equal to 20% of the longest mean length, the difference in the mean cross-sectional areas of the internal and external cavities is at most equal to 20% of the largest mean area, each external cavity of a continuous groove being connected to at least two internal cavities of the same groove and having a plurality of incisions opening onto the tread surface, each connecting two consecutive external cavities of the same groove and at least two connecting channels and at least one internal cavity.

22 Claims, 6 Drawing Sheets

(56) References Cited

U.S. PATENT DOCUMENTS

| | | | | |
|---|---|---|---|---|
| 5,924,464 | A | * | 7/1999 | White .................. 152/209.21 |
| 2003/0201048 | A1 | | 10/2003 | Radulescu et al. |
| 2006/0088618 | A1 | | 4/2006 | Radulescu et al. |
| 2011/0120610 | A1 | | 5/2011 | Fugier et al. |

FOREIGN PATENT DOCUMENTS

| | | |
|---|---|---|
| JP | 2-310108 A | 12/1990 |
| WO | 02/38399 A2 | 5/2002 |

* cited by examiner

TIRE TREAD HAVING IMPROVED RIGIDITY

FIELD OF INVENTION

The invention relates to tire treads and more particularly to the tread block patterns of these treads and to the tires provided with such treads which have a more lasting ability, over time, to clear away surface water present on the road surface in rainy weather, these treads not being penalized in terms of wear rate.

BACKGROUND OF INVENTION

As is known, the use of tires under wet-weather driving conditions requires the water present in the region of contact between the tire and the road surface to be cleared away as quickly as possible so as to ensure that material of which the tread is made makes contact with this road surface. Any water which is not pushed in front of the tire flows into or is partially collected by the grooves and incisions formed in the tire tread.

DEFINITIONS

A tread block pattern of a tread here means the geometry of that part of the tread that is intended to come into contact with a road surface, this tread block pattern being formed by raised elements delimited from one another by cuts (grooves, incisions, wells, cavities).

A groove here means a hollow that opens onto a tread surface that comes into contact with the road surface, this hollow having a mean width that is suited to the walls of material that delimit it never coming into contact with one another under normal conditions of use of the tire. The grooves may have any shape in cross section and in terms of the line that they follow along the tread surface and may be oriented in any direction. What is meant by the line that a groove follows along the tread surface here means the mean geometric line followed by the edges formed by the said groove on the said surface. A groove may have ends that are open towards the outside of the tread or alternatively may be circumferentially continuous.

An incision here means a thin slit of small mean width such that, under certain loading conditions, the walls of material that delimit it can, at least partially, come into contact with one another during passage in the contact patch.

In the present description, the terms "radial" or "radially" are used to indicate a direction which, when considered on the tire, is a direction perpendicular to the axis of rotation of the tire whereas, when considered on a tread alone, it corresponds to the thickness direction of the said tread. Moreover, the word "circumferential" is used to indicate a direction which corresponds to a direction tangential to a circle centered on the axis of rotation of the tire. This same direction corresponds to the longitudinal direction of the tread, this tread being formed in the manner of a flat strip before it is incorporated into a tire.

The total volume of the hollows (or cavities) in a tread is equal to the sum of all the volumes of hollows which may or may not open onto the tread surface of the tread in the as-new condition. Some of these hollows may open up onto the contact patch after the tread has become partially worn.

The total volume of a tread is equal to the sum of the total volume of material that can be worn away during running before the tire has to be removed (either in order to retread it or to replace it with a new tire) and of the total volume of hollows.

The total thickness E of a tread corresponds to the thickness of material intended to be worn away during running. By convention, this total thickness E does not take into consideration any thickness that might be provided for to allow the grooves to be partially recut during the regrooving operation. This total thickness E is measured on the as-new tire between the tread surface and the external surface of the wear indicators. Radially between the crown reinforcement of the tire and this total thickness E, there is generally an additional thickness E* of tread.

For tires intended for the steered or load-bearing axle of a heavy goods vehicle, it is commonplace for the tread of these tires to be provided with circumferential (or even longitudinal) grooves of a depth equal to the total thickens of the tread (this total thickness not taking into consideration any thickness that may be provided for to allow the grooves to be partially recut). This groove depth as a general rule is between 13 and 18 mm on tires intended for such axles. For tires intended for the driven axles, the depth of the grooves may nonetheless be as much as 24 mm. Thus it is possible to obtain a tread which in terms of clearing away any water present on the road surface always performs better than the minimal performance known as the safety performance, and does so regardless of the level of tread wear.

For tires of the prior art, the total volume of hollows is, as a general rule, between 15 and 25% of the total volume of the tread intended to be worn away during running (the total volume corresponding to the volume of material to which the said total volume of hollows is added).

Further, it is found that these tires have an effective volume of hollows Ve in the contact patch which is relatively high in the as-new condition (effective here meaning potentially capable of being filled with a liquid present on the road surface). This volume of hollows opening onto the tread surface in the contact patch is, on average, of the order of 100 $cm^3$ for a tire of 315/70 R 22.5 size. The effective volume of hollows Ve opening onto the tread surface in the contact patch is evaluated when the tire is subject to its nominal inflation and static loading conditions as defined by the ETRTO standard.

While grooves or, more generally, cavities are essential to clearing away the water in the contact patch, the resulting reduction in tread material can have an appreciable adverse effect on the wearing performance of this tread and therefore reduce the service life of the tire as a result of an increase in the wear rate. Other tire performance aspects may also be detrimentally affected, particularly the handling, road noise and rolling resistance performance aspects. It is also found that these grooves that are formed so that they have a working height equal to the height of the tread that is to be worn away may be the cause of endurance problems. Under certain running conditions, foreign bodies such as stones may become lodged in these grooves and attack the bottoms of these grooves causing breaks to appear in the rubber.

Creating a plurality of grooves on a tread therefore has the disadvantage of reducing the amount of tread material for a given width of tread and therefore of reducing the service life of the tire as a result of an increase in the wear rate.

Moreover, the grooves lower the compression and shear rigidities because these grooves delimit portions of material that are more sensitive to deformation by comparison with the portions that are delimited by incisions. This is because in the case of incisions the walls of material that delimit these incisions are able to come into contact with one another at least in the contact patch. This reduction in rigidity, where grooves are present, leads to an increase in deformations and results in a reduction in the wearing performance of the tread: greater wear is observed for a low fixed distance covered (and this corresponds to an increase in the wear rate of the tread). Further, an increase in rolling resistance is also observed and therefore an increase in the fuel consumption of vehicles fitted with such tires as a result of an increase in hysteresis losses associated with the deformation cycles of the material that makes up the tread.

It is an object of the present invention to provide a tread provided with grooves and with incisions that is able to have a performance the same as or better than the minimum safety performance for water clearance and for this to be true regardless of the level of tread wear while at the same time appreciably improving the performance in terms of service life to wear, reducing the rolling resistance and improving the ability of the tread to withstand attack.

SUMMARY OF THE INVENTION

In order to achieve this objective, there is proposed a tire tread of total thickness E having a tread surface intended to come into contact with the road surface, this tread comprising at least two wearing layers, i.e. at least a first and a second wearing layer within its thickness. The first layer is the layer nearest to the outside when the tread is new and is the first to come into contact with the road surface. Moreover, this tread comprises—at least one continuous groove formed by a plurality of external cavities opening onto the tread surface in the as-new condition and a plurality of internal cavities, the latter being placed radially and completely inside the tread surface in the as-new condition.

In this application a wearing layer means part of the tread connected to the maximum depth of the grooves in the said wearing layer. A wearing layer has a thickness which is less than the total thickness of the tread and which is equal to the maximum depth of the grooves or cavities present in this wearing layer. The treads of the invention comprise at least two wearing layers, some of the grooves or cavities of which are formed only in one of the said layers. It is of course possible and even advantageous that, in this configuration, each wearing layer becomes active before a previous wearing layer is completely worn away; in such a case, there is an overlap between at least two wearing layers. A wearing layer becomes active as soon as the cavities or grooves formed within this layer open onto the tread surface of the tire in contact with the road surface to clear away the water present on the said road surface in wet weather. The first wearing layer corresponds to that part of the tread that is radially nearest to the outside in the as-new condition.

The first wearing layer extends, in the tread surface in the as-new condition, into the thickness of the tread as far as the radially innermost points of the external cavities. Radially innermost is to be understood as meaning the points most distant from the tread surface in the as-new condition.

After this first wearing layer there is another wearing layer defined as being the layer extending into the thickness of the tread as far as the radially innermost points of the internal cavities of the other wearing layer considered. This layer extends from the radially outermost points of the internal cavities.

The external cavities have a mean depth P1 less than the total thickness E of the tread, a mean length L1 and a cross section, in a plane of section perpendicular to the tread surface, of area S1 (these preferred arrangements apply to all the variants described in this document).

The internal cavities have a mean height P2 less than the total thickness E of the tread (this height being measured between the radially outermost points and the radially innermost points of the walls delimiting the said cavities), a mean length L2 and a cross-sectional area S2 (these preferred arrangements apply to all the variants described in this document).

All these cavities of one and the same continuous groove are such that the difference between the mean lengths of the internal cavities and of the external cavities is at most equal to 20% of the longest mean length (i.e. $0.8 \leq L1/L2 \leq 1.2$), and the difference in the mean cross-sectional areas of the internal and external cavities is at most equal to 20% of the largest mean area (i.e. $0.8 \leq S1/S2 \leq 1.2$).

Furthermore, each external cavity of a continuous groove is connected to at least two internal cavities of the same groove by connecting channels that provide continuity between the said internal and said external cavities. Each connecting channel has two ends connected to an internal cavity on the one hand and to an external cavity on the other; each connecting channel has cross sections (in a plane of section perpendicular to the mean direction of the groove) the areas of which are respectively equal to the cross-sectional areas of the internal and external cavities that are connected by this connecting channel.

This tread further comprises a plurality of incisions opening onto the tread surface of the tread in the as-new condition, each of the said incisions connecting two consecutive external cavities of one and the same groove and at least two connecting channels and at least one internal cavity.

Thanks to the presence of these connecting cavities it is possible to ensure that water circulates from an external cavity to an internal cavity of one and the same groove thus better clearing away the water in the contact patch while at the same time reducing hydrodynamic head losses.

Each layer has a thickness at most equal to 75% of the total thickness E of the tread (each wearing layer comprising grooves or cavities that are specific to it and which are not to be found in their entirety in some other layer).

Advantageously, the thickness of the tread radially on the outside of each internal cavity is greater than 25% of the total thickness E of the tread.

The external cavities and the internal cavities preferably have mean depths at most equal to 75% of the total thickness E of the tread.

Thanks to this tread structure, a volume of hollows is obtained that is suitable for satisfactorily clearing away water while at the same time limiting the reduction in rigidity of the tread in the as-new condition, this volume of hollows being formed by the external cavities in a first phase of use and then by just the internal cavities in another phase of use, these internal and external cavities being connected to one another by connecting channels. The groove according to the invention can be likened to a continuous groove that opens regularly and discontinuously onto the tread surface of the tread in the as-new condition. This groove may adopt a wavy overall shape intersecting the tread surface in the as-new condition. It is the presence of rubbery material radially on the outside of the internal cavities and radially on the inside of the external cavities that increases the rigidity of the tread, particularly in terms of compression.

By reducing the level of hollows at the surface in the as-new condition, the tread according to the invention also has the advantage of being less sensitive to the retention of stones and therefore offers better resistance to breakage at the bottom of the grooves which breakages are caused by the penetration of stones into the rubbery material. What is meant here by the level of hollows at the surface is the ratio between the surface area of the external cavities open on the tread surface and the total surface area of the said tread. The fact that the internal cavities of one and the same groove do not open onto the tread surface in the as-new condition effectively makes it possible to reduce the level of hollows in the as-new condition, while at the same time having effective water clearance in the groove.

For preference, the tread according to the invention is such that internal cavities are arranged within the thickness of the tread to become open to the outside when the tread partially worn, this partial wear being less than the total wearing away in the first wearing layer. What is meant by partial wear that is less is that the reduction in thickness of the tread as a result of wear is less than the reduction in thickness corresponding to the wear in the first layer, i.e. corresponding to the disappearance of the external cavities. In this advantageous configuration it is said that the distance of overlap between the wearing layers is positive.

For preference, this distance of overlap between the wearing layers is less than half the depth P1 of the first cavities.

This variant has the advantage of ensuring a near-constant working volume of hollows for clearing away water present in the contact patch, regardless of the level of tread wear.

For preference, the tread according to the invention is such that each connecting channel connecting an external cavity to an internal cavity of one and the same groove has a length Li greater than zero and less than the circumferential length L1 of the external cavities. (Li measures the shortest length in the circumferential direction between one end of the external cavity and one end of the internal cavity). For preference, the length Li of each connecting channel is greater than zero and at most equal to 50% of L1.

In a variant of the invention, the tread is such that the internal and external cavities of two successive wearing layers of one and the same groove do not overlap—completely or in part—in the direction of the thickness of the tread, i.e. that they are entirely offset from one another in the mean direction of the groove. The mean direction of a groove corresponds to the direction in which the groove allows the water to flow when running over a wet road surface; this direction in general corresponds to the direction of largest dimension of the groove.

This variant whereby the internal and external cavities do not overlap—completely or in part—within the thickness has the advantage of minimizing hydrodynamic head losses in the path followed by the water from the external cavities to the internal cavities. In the event of an overlap or superposition—completely or in part—of the external and internal cavities that means that one end of an external cavity is situated beyond one end of an internal cavity which is within the scope of the present invention but is considered to be less favorable from a point of view of how the water flows through the groove.

According to one advantageous embodiment of the invention, the total volume of hollows is at least equal to 7% and at most equal to 12% of the total volume V of the tread.

According to another advantageous embodiment of the invention, the effective volume of hollows Ve (in the laden state) for each wearing layer, satisfies the following relationship:

$$0.4 Se < Ve < 0.8 Se,$$

in which 0.4 and 0.8 are heights expressed in millimeters and Se is the surface area (in mm$^2$) delimited by the external outline of the contact patch of the tread measured under static conditions under nominal load and pressure, with the tire being fitted to the recommended rim.

The heights of 0.4 mm and 0.8 mm correspond to mean depths of water that may be present on a road surface in wet weather and that has to be cleared away in order to maintain good contact between the tread and the road surface. These mean heights multiplied by the surface area Se—which surface area is determined by the outline of the contact patch of the tread on the same road surface and expressed in mm$^2$ (the surface areas corresponding to the cavities that open onto the tread surface are taken into consideration here)—give an indication of the effective volume of cavities Ve (in the laden state). If this volume Ve is less than 0.4 times Se, it is not enough to obtain satisfactory water clearance. If this volume Ve is greater than 0.8 times Se then it is deemed excessive from the standpoint of obtaining suitable tread rigidity.

The effective volume of hollows Ve in the contact patch plays a part in draining water away from the contact patch where the tread makes contact with a road surface.

In order in particular to increase the level of hollows at the surface of the tread in the contact patch (the ratio between the surface area of hollows opening onto the tread surface of the tread in the as-new condition, and the total surface area of the contact patch), the tread comprises at least one groove formed of a plurality of pairs of external cavities, each of which is extended by a connecting channel, these connecting channels opening into one and the same internal cavity. The volume of this internal cavity can be appreciably reduced by comparison with the volume of the external cavities or adapted by those skilled in the art according to the desired performance and according to the tire concerned.

In another variant, the effective volume of hollows Ve increases with the level of wear of the tread, and therefore increases from one wearing layer to the next.

In another variant, the tread according to the invention comprises at least one groove, the external cavities of which are each extended at both ends by two connecting channels, these connecting channels each opening into separate internal cavities. Further, each internal cavity, as well as the connecting channels that connect this internal cavity to two external cavities, are extended radially towards the tread surface of the tread in the as-new condition by an incision to allow the tread according to the invention to be molded and demolded.

That which has been described for a tread comprising two wearing layers can easily be applied to a number of wearing layers greater than two and notably to three wearing layers. In such a variant, the tread according to the invention comprises additional cavities situated in a third wearing layer which extends the second wearing layer radially on the inside. These additional cavities are connected to the internal cavities of the second wearing layer by additional connecting channels. These additional cavities determine a third level of wear and open onto the tread surface after tread wear has practically worn away the second cavities. One application of this variant is particularly advantageous for tires that have very thick treads.

The continuous grooves formed of a succession of external and internal cavities connected by connecting channels, that form the subject of the invention, can be oriented in any direction along the tread or along the tire (i.e. longitudinally or transversely or obliquely in relation to one or other of these directions).

Advantageously, grooves according to the invention are directed essentially in a direction corresponding to the largest dimension of the tread: whether that is the longitudinal direction of the tread or the circumferential direction when this tread is fitted to a tire.

In one particularly advantageous variant, a tread according to the invention comprises a first plurality of continuous grooves according to the invention in a first direction and a second plurality of continuous grooves according to the invention in a second direction that intersects the first direction to form a network of criss-cross grooves. Advantageously, these first and second pluralities of grooves according to the invention are arranged in such a way that the internal cavities of these first and second pluralities of grooves are interconnected in order to enhance the criss-cross grid effect. What is meant by interconnected is that it is possible for fluid to circulate between the various internal cavities of the two pluralities of grooves.

In an advantageous variant, a tread according to the invention comprises a first plurality of grooves according to the invention in a first direction and a second plurality of grooves according to the invention in a second direction that intersects the first direction to form a network of continuous criss-cross grooves. These first and second pluralities of grooves according to the invention can be arranged in such a way that the internal cavities of these first and second pluralities of grooves are located at different depths so as, in this case, to obtain a level of hollows that remain substantially constant irrespective of the level of tread wear. What is meant by level of hollows is the ratio between the surface area of hollows on the tread surface considered and the total surface area of the tread at the wear level considered. The internal cavities, even though they are connected to external cavities, are not considered to contribute to a tread surface level of hollows until they appear on a new tread surface once the tread has become worn.

In another variant, it is possible to plan for the presence of at least one channel directed in a direction parallel to the mean direction of a continuous groove formed of a succession of internal and external cavities, this channel being situated at a depth corresponding to that of the internal cavities of the said groove and this channel being extended by an incision either towards the tread surface of the tread or towards the internal surface of the said tread. What is meant by the internal surface of a tread is the surface via which the tread is in contact with the tire to which it is fitted. These incisions and channels may easily be produced when the tread is being molded. The cross section of this channel is determined so that when the channel opens onto the tread surface following tread wear, a new groove is formed of a cross section suited to correct flow of the water present on the road in wet weather. This channel is designed to form a new groove by opening onto the tread surface after partial wear that is at most equal to the thickness of the first wearing layer.

In this variant, the tread may further comprise means for placing at least one channel in communication with a plurality of internal cavities of a continuous groove. Thus the ability to clear away water when driving on a wet road surface is improved, at least after a part-wear condition that sees the channel open onto the tread surface, and form a new groove.

In order to maintain a satisfactory level of rigidity of the tread according to the invention it is advantageous for the incisions that extend the internal and external cavities to be provided with means of mechanically blocking relative movement of the opposing walls that delimit the said incisions. Such means may adopt the form of a waviness of the opposing walls or alternatively of reliefs molded onto the said walls and suitable for engaging with one another.

The invention also relates to a tire provided with a tread defined according to the invention, this tread radially on the outside surmounting a tire cover consisting of a carcass reinforcement and of a crown reinforcement. The tread of this tire is produced as in one of the preceding variants, certain dimensions of the grooves being connected with the mean length of the contact patch of the tread under nominal conditions of use of the tire, these nominal conditions of use being defined in the ETRTO or JATMA standards.

It is advantageous that, for each circumferentially oriented groove formed of cavities opening onto the tread surface and of cavities under the tread surface, there be at least one external cavity always in the contact patch in order to allow water clearance. If the mean length of the contact patch under nominal conditions of use of the tire provided with a tread according to the invention is denoted T (this mean length being obtained by dividing the total surface area delimited by the external outline of this contact patch by the width W of the said surface area), it is more preferable still for the mean length of these external cavities of the circumferential grooves to be between 25% and 75% of the mean length T of the contact patch.

In a variant that has not been depicted, the tread comprises a plurality of grooves which are formed of a plurality of external cavities and of internal cavities connected by connecting channels oriented in the longitudinal direction of the tread, these grooves being arranged in such a way that the external cavities that open onto the tread surface in the as-new condition are arranged offset from one another and so that the internal cavities are also arranged so as to all be offset from one another. The advantage of such an arrangement is that it limits the reduction in shear rigidity of the tread notably under transverse loading (for example when cornering).

Other features and advantages of the invention will become apparent from the description given hereinafter with reference to the attached drawings which, by way of nonlimiting examples, show some embodiments of the subject matter of the invention.

DESCRIPTION OF THE PREFERRED EMBODIMENTS

To make the figures easier to study, the same reference symbols are used to describe variants of the invention when these reference symbols refer to elements of a similar nature, whether this be a structural or even a functional one.

Figures 1, 2, 3:
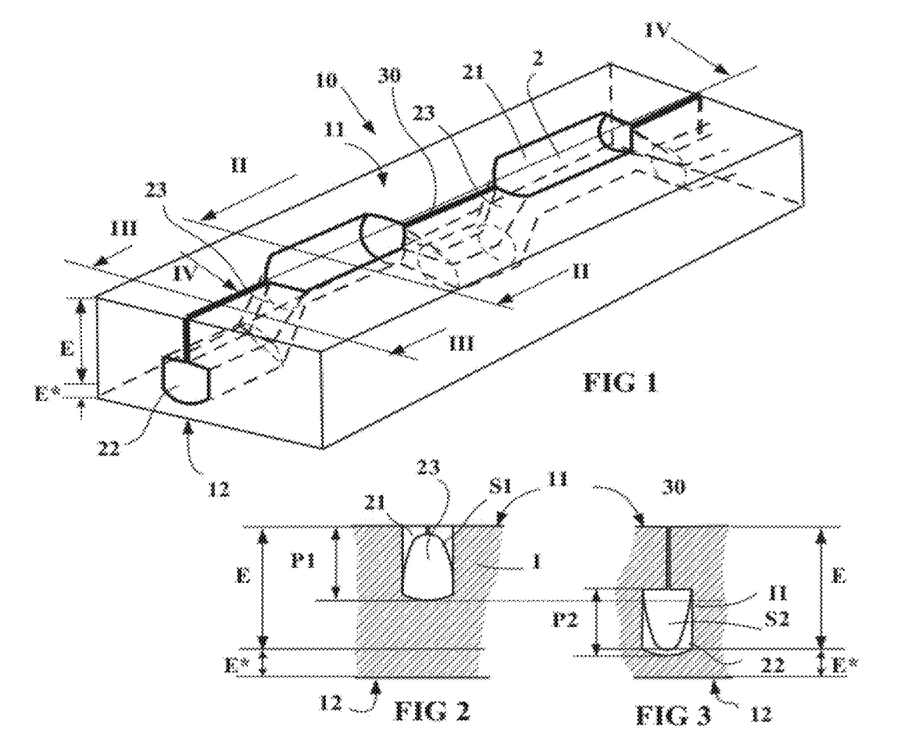
FIG. 1 is a partial view of the tread surface of a tread comprising a continuous groove according to the invention.
FIG. 2 is a view in section on II-II taken across the tread of FIG. 1.
FIG. 3 is a view in section on III-III taken across the tread of FIG. 1.

FIG. 1 shows part of a tread 10 in the as-new condition, this tread having a thickness E, a tread surface 11 intended to come into contact with the road surface during running and a surface 12 defining the thickness of the tread and situated on the opposite side to the tread surface 11. This part of the tread comprises a continuous groove 2 according to the invention. The groove 2 is formed of a succession of a plurality of external cavities 21 of elongate shape of length L1 opening onto the tread surface 11 in the as-new condition, and of a plurality of internal cavities 22 of length L2 situated completely within the tread in the as-new condition. Connecting channels 23 are formed to connect the internal cavities 22 and the external cavities 21 and thus ensure the continuity of the groove 2 in the main direction of the groove. These connecting channels 23 have a length Li measured in the main direction of the groove. In order to ensure that liquid flows correctly between the internal and external cavities, the connecting channels have one end connected to an external cavity, this end having a cross section equal to the cross section of the said external cavity. These same connecting channels have another end connected to an internal cavity, this other end having a cross section equal to the cross section of the said internal cavity. In this particular instance, the cross sections of the external and internal cavities are substantially the same and each connecting channel maintains substantially the same cross section from one of its ends to the other. Of course, this cross section could be modified and varied between the two ends.

With a groove 2 according to the invention everything is as if there were a tread with two wearing layers I and II taking over from one another during use of the tread, each wearing layer having different cavities on the tread surface. A first layer I sees the appearance of the external cavities 21 on the tread surface and a second layer II sees the appearance of the internal cavities 23 in turn on a new tread surface. Before the internal cavities appear, the connecting channels continue to play their part and in particular to ensure the continuity of the groove.

FIG. 2 is a cross section through FIG. 1 on a plane of section referenced II-II in FIG. 1.

This FIG. 2 shows the cross section of an external cavity 21 of an area S1 and extending into the tread over a depth P1 equal to around 74.5% of the total thickness E of the tread (this thickness corresponding to the thickness that can be worn away during running).

This external cavity 21 is extended on each side by connecting channels 23 connecting it to internal cavities 22 visible in cross section in FIG. 3.

FIG. 3 is a cross section of FIG. 1 on a plane of section referenced III-III in FIG. 1.

This FIG. 3 shows the cross section of an internal cavity 21 of an area S2 substantially equal to the area S1 of the external cavities 21 and extending towards the tread surface by an incision.

This internal cavity 22 has dimensions comparable with those of the external cavities 21; the respective lengths L1 and L2 (see FIG. 4) of the external and internal cavities are substantially equal here. In order for the tread always to have grooved elements on its tread surface regardless of the degree of tread wear it is advantageous, as is the case here, for the internal cavities 22 of one and the same groove 2 to appear before the external cavities 21 have completely disappeared. This then forms a first wearing layer I extending between the tread surface of the tread in the as-new condition and the innermost points of the external cavities 21; a second layer extends as far as the points of the internal cavities 22 that are nearest to the inside of the tread. Of course, it is possible to plan for the second cavities to appear only after the first ones have been completely worn away.

Figure 4:
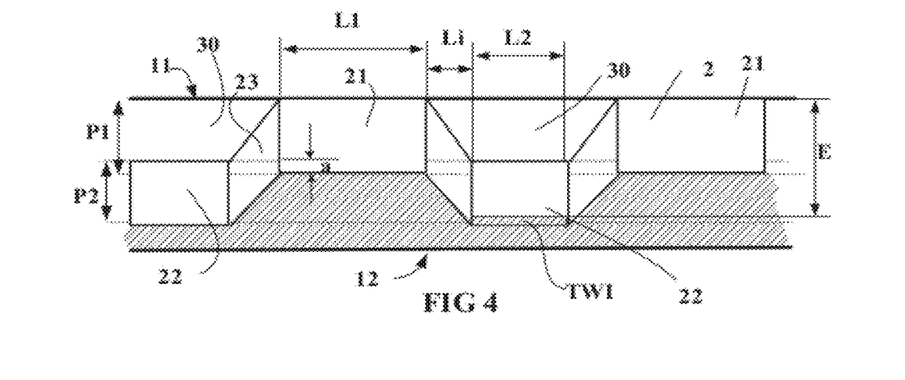
FIG. 4 is a view in section on IV-IV taken across the tread of FIG. 1.

FIG. 4 is a cross section through FIG. 1 on a plane of section referenced IV-IV in FIG. 1.

This FIG. 4 identifies the succession of external cavities 21 and of internal cavities 22 which are joined together by connecting channels 23 of length Li. Moreover, an incision 30 that in the as-new condition opens onto the tread surface 11 connects one internal cavity 22, two connecting channels 23 and two external cavities 21. This incision 30 is positioned in the tread so that it opens onto the tread surface 11 in the as-new condition to make the groove according to the invention easier to mold and demold. Of course, provision could be made for this incision to open onto the face 12 of the tread which is the opposite face to this tread surface 11: in this case, the tread with its grooves and incisions would need to be molded before it was combined with a casing to form a tire.

When the first wearing layer I is completely worn away, the initially internal cavities 22 open onto the new tread surface and, given the remaining height of tread that can be worn away may sometimes be enough to act as a reservoir for any water present on the road surface.

Everything is as if the groove 2 followed a wavy line in the radial direction (i.e. in the thickness of the tread), this groove comprising a succession of parts (external cavities) that open onto the tread surface in the as-new condition alternating with the parts (internal cavities) that are entirely within the tread in the as-new condition, the connecting cavities providing continuity between the volumes of the said internal and external cavities (i.e. allowing fluid to flow from the outside inwards and vice versa). Thus, as the contact patch makes contact with the road surface, water present on this road surface can be cleared away by the external cavities towards the internal cavities. It is of course necessary that there will always be at least one external cavity completely or partially open in the contact patch. The dimensions of the external cavities and those of the internal cavities are determined so as to meet this condition for a given length of contact patch.

This same FIG. 1 shows the presence of a wear indicator TWI which fixes the total thickness of tread that can be worn away during running. This tire wear indicator is molded into the bottom of an internal cavity 22 and has a height equal in this instance to 1.6 mm in order to comply with the legal requirements.

By virtue of these arrangements, it is possible in the as-new condition to have an overall rigidity that is higher than can be achieved with the usual grooves each of which would have a total depth equal to the distance from the innermost points of the internal cavities to the tread surface in the as-new condition. At least during the initial part of tread wear (i.e. until 75% of the depth of the external cavities has been worn away), the function of clearing away and collecting water is performed by this groove because the water collected in the external cavities can run into the connecting channels and the internal cavities. The water thus cleared away can then re-emerge via another external cavity. Advantageously, the connections between the various cavities are suitable to not detract from the flow of fluid within the groove.

When the first wearing layer I has been completely worn away, the internal cavities 22 open over their entire length onto the tread surface and can then act as reservoirs to hold some of the water present on the road surface.

Figures 5, 6:
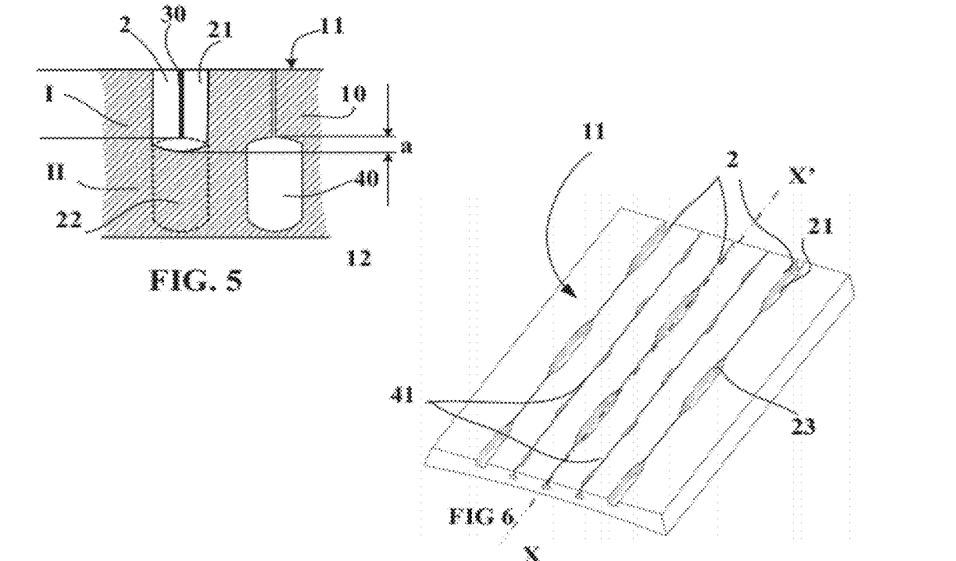
FIG. 5 is a cross section of an embodiment variant whereby a continuous channel situated entirely under the tread surface is provided.
FIG. 6 is a partial view of a tread according to the invention in the as-new condition.

However, it is then advantageous, as FIG. 5 shows, to combine with this groove the presence of a continuous channel 40 with an overall orientation the same as or substantially the same as that of the groove 2 and the function of which is to form a new continuous groove which appears and opens onto the tread surface following partial wear such that the internal cavities 22 of the second wearing layer II have also appeared on the said new tread surface. The function allowing the water to flow is then preserved because the channel 40 has become a continuous groove capable of clearing away the water and allowing it to flow out, the internal cavities 22 of the groove 2 according to the invention forming water holding reservoirs which in this variant are discontinuous from one another.

This FIG. 5 which is a cross section through a portion of a tread according to the invention, shows the presence of a groove 2 comprising a plurality of external cavities 21 and of internal cavities 22 which are connected by connecting channels 23, and that of a channel 40, the cross sectional area of which is suited to allowing water to flow as soon as a new groove is formed following partial wear of the tread corresponding to the depth at which the channel 40 begins to appear on the new tread surface.

For preference, the channels formed within the tread are sized to offer a suitable water clearing volume and, in particular, these channels may have heights substantially equal to the height of the internal cavities. In this variant, it is possible to keep the working volume of hollows for clearing water away from the road surface near-constant or even constant and to do so throughout the service life of the tire provided with a tread as described.

Continuous grooves formed of a plurality of internal cavities and of external cavities according to the invention may be oriented in any direction in a tire tread.

Grooves that are continuous and wavy in the thickness according to the invention may be formed in a tread such that they do not open onto the tread surface in the as-new condition but only after the tread has become partially worn. Of course, it is sensible to combine these with:
either shallow grooves, which progressively become replaced with the grooves according to the invention
or grooves according to the invention which in the as-new condition of the tread open onto the tread surface.

A degree of overlap a between the external and internal cavities is provided so that after partial tread wear, the internal cavities open onto the tread surface before the external cavities completely disappear.

Another embodiment of a tire of 315/70 R 22.5 size comprising a tread according to the invention is now given.

FIG. 6 depicts just part of this tread, the longitudinal direction of which is indicated by the direction of the axis XX' in this figure. This tread is of width W equal to 258 mm and has a total thickness E equal to 9.4 mm measured as being the distance separating the tread surface of the tire in the as-new condition from the wear indicators (these tire wear indicators are positioned in such a way as to indicate a groove height of 1.6 mm). Moreover, an additional thickness E* (here equal to 6.6 mm) is provided between the tread and the tire crown reinforcement. This tread is provided with three continuous grooves 2 of longitudinal orientation (i.e. oriented circumferentially once this tread has been incorporated into a tire), each of these grooves being formed of a succession of external 21 and internal 22 cavities, the external cavities 21 opening onto the tread surface 11 of the tread in the as-new condition and the internal cavities 22 being formed completely under the tread surface in the as-new condition.

Connecting channels 23 connect the external cavities to the internal cavities. Each connecting channel has an end of an area equal to the cross-sectional area of the external cavity to which it is connected and at its other end of an area equal to the cross-sectional area of the internal cavity to which it is likewise connected. All these continuous grooves 2 have their main direction substantially oriented in the longitudinal direction of the tread. Alternatively, connecting channels of cross-sectional area smaller than the cross-sectional areas of the internal or external cavities may likewise be used.

In this particular instance, the length L1 of each external cavity is equal to 150 mm and the length L2 of each internal cavity is equal to 110 mm; the length Li of the connecting channels is equal to 15 mm.

Each external cavity 21 has a mean width equal to 12 mm and a depth of 7 mm (i.e. 74.5% of the total thickness E). The walls delimiting an external cavity may be a mean angle of 15 degrees with a perpendicular to the tread surface and tend to converge towards one another in the direction towards the bottom of the said cavity.

Each internal cavity has a mean width equal to 9 mm and a depth of 7 mm (i.e. 74.5% of the total thickness E). The walls delimiting an internal cavity may be a mean angle of 15 degrees with a perpendicular to the tread surface and tend to converge towards one another in the direction towards the bottom of the said cavity.

Moreover, the internal cavities 22 and the connecting channels 23 are extended towards the tread surface by incisions 30 of which the delimiting walls are provided with recessed and raised patterns that engage with one another to limit as far as possible any relative movement between the said walls and thus maintain greater rigidity. In this particular instance, the mean distance separating the opposing walls of one and the same incision is equal to 0.4 mm. It is noted that the external cavities 21 have substantially the same dimensions and that they are arranged so as to be offset from one another in the longitudinal direction so as to reduce the impact that they have on road noise and increase the efficiency with which they pick up water when driving over wet ground.

An overlap equal to 3 mm is provided between the external cavities and internal cavities so that following partial tread wear, the internal cavities open onto the tread surface before the external cavities completely disappear.

Figure 7:
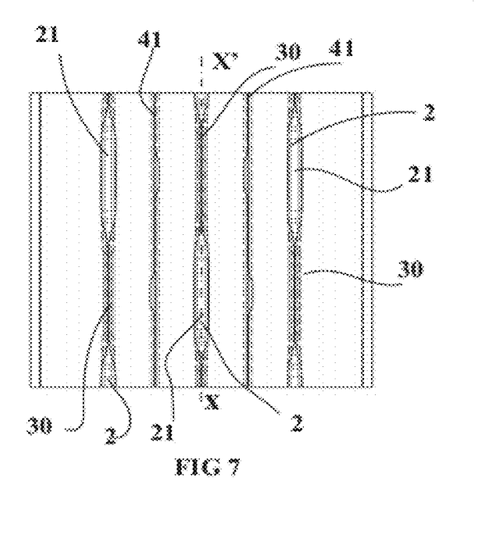
FIG. 7 is a plan view of the tread surface of the tread of FIG. 6.

FIG. 7 is a plan view of the tread surface of the tread of FIG. 6 when the first wearing layer in contact with the road surface is present. It may be seen that the tread surface comprises three continuous grooves oriented circumferentially and intercalated axially between them two incisions extended radially inwards by a circumferentially continuous channel 40.

This tread has a total volume of hollows Vc equal to 9% of a volume equal to the sum of the total volume V of material of the tread and of the total volume of hollows.

Each wearing layer of this tread has an effective total volume of hollows Ve in the contact patch which is equal to 40 cm$^3$. This effective volume Ve, expressed in mm$^3$, satisfies the relationship 0.4 St<Ve<0.8 St (we have 24120<40000<48240), the surface area St being expressed in mm$^2$. In this instance, the surface area St is equal to 60300 mm$^2$, this surface area being delimited by the external outline of the contact patch of the tread measured under static conditions under nominal load and pressure, with the tire being fitted on the recommended rim.

Figure 8:
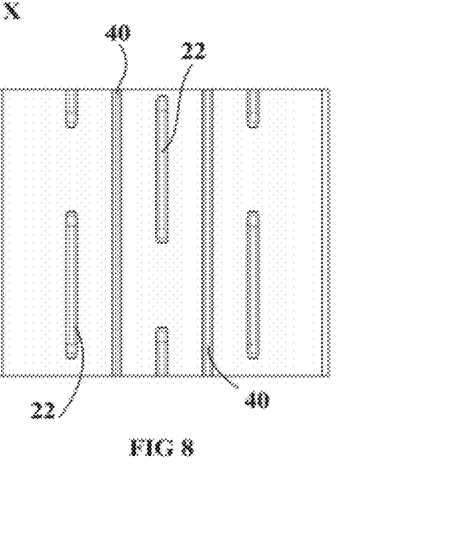
FIG. 8 is a plan view of the tread surface of the tread of FIG. 7 following tread wear down to the second wearing layer.

FIG. 8 is a plan view of the tread surface of the tread of FIG. 6 when the tread has worn down to the second wearing layer. It shows the internal cavities which have opened onto the tread surface and are discontinuous from one another and new circumferential grooves formed by the appearance of the channels on the tread surface.

Figure 9:
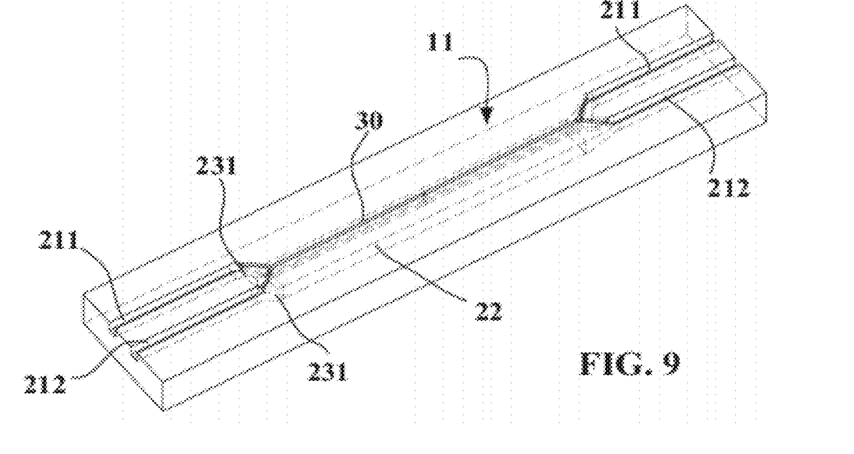
FIG. 9 is a partial view of a variant of a continuous groove having a pair of external cavities connected to one internal cavity.

In another advantageous variant of the invention, at least one groove is as partially shown in FIG. 9, i.e. at least one continuous groove 2 is formed of a plurality of external cavities 211, 212 opening onto the tread surface 11 in the as-new condition, these external cavities 211, 212 being formed in pairs, each pair of first cavities being extended by connecting channels 231, 232 respectively, the latter connecting channels meeting to open into one and the same first end of an internal cavity 22 formed within the tread. This internal cavity is extended at its second end by two connecting channels connected to a further pair of first cavities opening onto the tread surface in the as-new condition of the tread. Just like in the variant discussed in relation to FIG. 1, the connecting channels and the internal cavities are extended towards the tread surface by an incision, the ends of which locally on the tread surface form a Y-shaped line.

This variant gives a better distribution of the external cavities that open onto the tread surface of the tread in the as-new condition.

Figure 10:
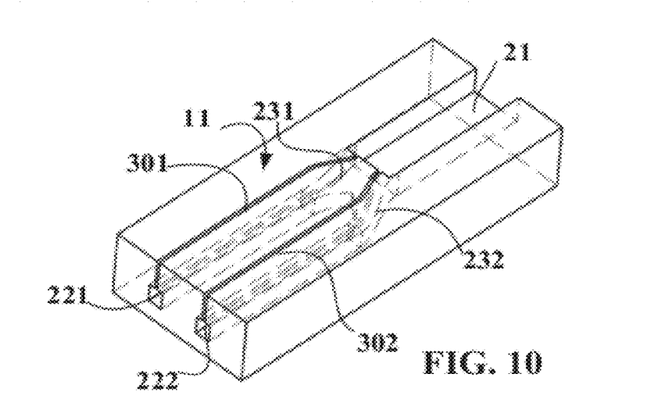
FIG. 10 is a partial view of a variant of a continuous groove having one external cavity connected to two internal cavities.

In another advantageous variant of the invention, at least one groove 2 is as partially shown in FIG. 10. In this variant, a groove 2 is formed of a plurality of external cavities 21 that open onto the tread surface 11, each external cavity being extended by two connecting channels 231, 232, each connecting channel opening at one end into an internal cavity 221, 222. In this variant, the number of internal cavities is therefore twice the number of external cavities. This variant, for a water clearance volume chosen according to the desired result that a tire is to achieve, makes it possible to obtain a more even distribution of the internal hollows within the tread and therefore less of an impact on the rigidity of the tread. Incisions 301, 301, extend the internal and connecting cavities towards the tread surface 11. Each cavity of the pair of internal cavities may be situated at one and the same depth with respect to the tread surface 11 or may be situated at different depths.

Figure 11:
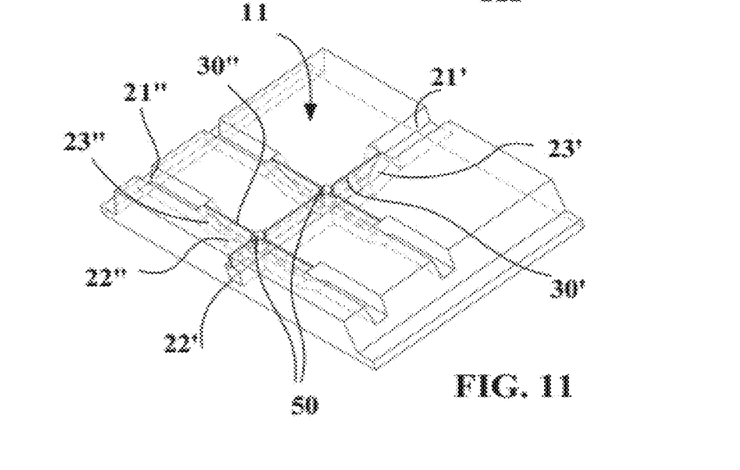
FIG. 11 is a partial view of a variant whereby a tread is provided with grooves according to the invention oriented in two intersecting directions, these grooves being interconnected.

In another advantageous variant of the invention which is shown with the support of FIG. 11, a tread is provided with a first plurality of longitudinally directed grooves 2' (i.e. grooves that run circumferentially on the tire provided with this tread) and with a second plurality of grooves 2" oriented to intersect the first plurality of grooves 2'. In this particular instance, the angle formed by these pluralities of grooves is equal to 90°, but it is quite clearly possible to use any other value.

Each groove 2' of the first plurality of grooves is formed of a plurality of internal cavities 22' and of external cavities 21' which are connected by connecting channels 23' defining a first wearing layer and a second wearing layer of the tread.

Each groove 2" of the second plurality of grooves is formed of a plurality of internal cavities 22" and of external cavities 21" which are connected by connecting channels 23". The arrangement in the variant shown is such that the position within the thickness of the tread is substantially identical for the internal cavities of the first and second grooves 2' and 2".

Further, the first and second grooves 2', 2" interconnect at their internal cavities 22' and 22". The internal cavities intersect one another to form a network of cavities both on and beneath the tread surface, said network greatly favoring the clearance of water.

Moreover, the internal cavities and the connecting channels are extended towards the tread surface by incisions 30' and 30" which intersect and which at their intersections have a kind of well of circular section 50. These wells 50 have the advantage of increasing the amount of water that the tread can clear away when running over wet ground.

In a variant that has not been depicted, the first and second pluralities of grooves 2', 2" are not necessarily directed so that they are perpendicular to one another. Thus there may be a first plurality of grooves oriented in the circumferential direction and a second plurality of grooves oriented in a direction that makes an angle other than 90° to the first plurality of grooves. It is also possible to conceive of a variant that further comprises a third plurality of grooves oriented notably, although not necessarily, symmetrically in relation to the second plurality of grooves 2" about the first plurality of grooves 2'.

Figure 12:
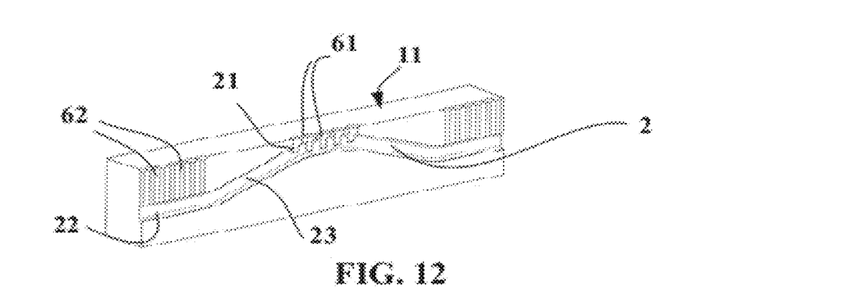
FIG. 12 shows a variant of the invention whereby the incisions that connect the internal cavities and the connecting channels to the tread surface are provided with wells that open onto the tread surface.

In another variant that has been depicted in FIG. 12, there is a groove 2 according to the invention that appears on the tread surface after the tread has been partially worn, i.e. the external cavities 21 do not open onto the tread surface in the as-new condition. Moreover, the external cavities 21, the connecting channels 23 and the internal cavities 22 are extended towards the tread surface by an incision which is itself provided with a plurality of widenings 61 and 62. Widenings 61 are formed towards the outside of the external cavities 21 and widenings are formed towards the outside of the internal cavities 22 so as to supplement and increase the water clearing effect of the groove 2. These widenings are, in this instance, oriented substantially perpendicular to the tread surface; they could be inclined by an angle other than 90° to this surface as need be. These widenings here have the form of cylindrical wells.

Figure 13:
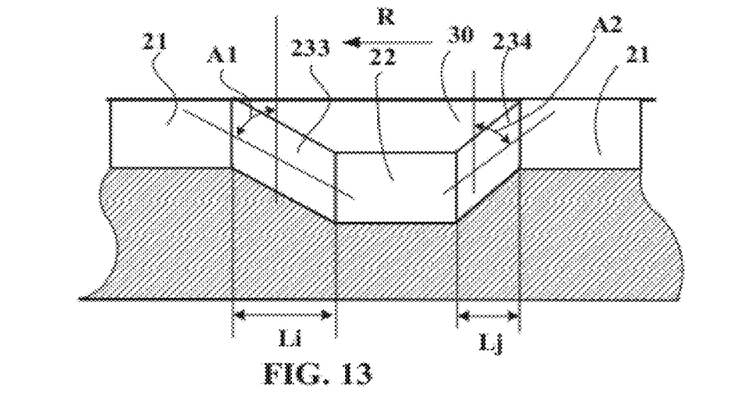
FIG. 13 is a cross section through a variant of tread according to the invention in which the inclinations of the connecting channels at the ends of an internal cavity are different.

FIG. 13 shows another variant which is beneficial for creating a directional effect in the flow of water running along inside the groove during the running of a tire provided with a tread itself provided with at least one continuous groove formed of a plurality of external cavities 21 and internal cavities 22 connected by connecting channels 231, 232.

In this variant, the connecting channels 233, 234 situated one each side of an internal cavity 22 have different respective lengths Li, Lj and therefore have mean inclinations A1 and A2 which are different (these angles A1 and A2 are measured with respect to a direction perpendicular to the tread surface). In the preferred variant, the connecting channel that is most steeply inclined with respect to a perpendicular to the tread surface (i.e. the longest channel) is situated on the side that is first to come into contact with the road surface (the arrow R indicates the direction of rotation). Through this contrivance a tread block pattern is created that has a preferred direction of running (a visible means may be affixed to the tread or to the tire to indicate this preferred direction).

Figure 14:
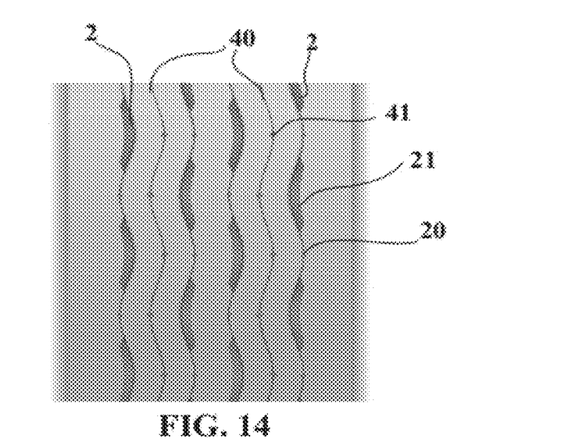
FIG. 14 shows a variant whereby the grooves and incisions follow wavy paths.

In the variant depicted in FIG. 14, which is fairly similar to the variant depicted in FIGS. 6, 7 and 8, a tread comprises, in the as-new condition, a plurality of continuous grooves of longitudinal orientation, these grooves 2 being formed of a succession of internal cavities 22 and of external cavities 21 connected by connecting channels 23. To improve the longitudinal grip, these grooves 2, on the tread surface 11, follow a pattern of wavy overall shape. There may also be seen, in the variant depicted, the presence of holes formed on each incision situated between two successive external cavities; these holes extend from the tread surface to the internal cavities 22. Further, the tread comprises a longitudinal incision 40 which likewise has a wavy overall shape substantially parallel to the shape of the grooves 2; this incision 40 is extended into the thickness of the tread by a channel as described earlier and intended to appear on the tread surface to form a new groove once the tread has been partially worn.

In the variant depicted with this FIG. 14, each (first or second) cavity has a curved shape, but the person skilled in the art would be able to choose any other geometric shape, notably a straight or zig-zag shape.

Figure 15A:
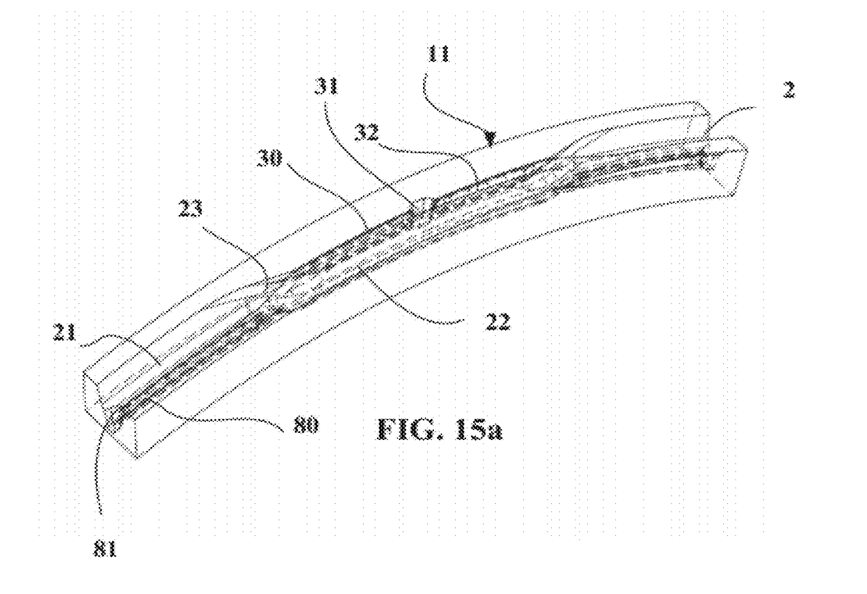
FIGS. 15a and 15b show a variant whereby the external cavities of one and the same continuous groove are extended towards the inside of the tread by an incision provided with blocking means.
Figure 15B:
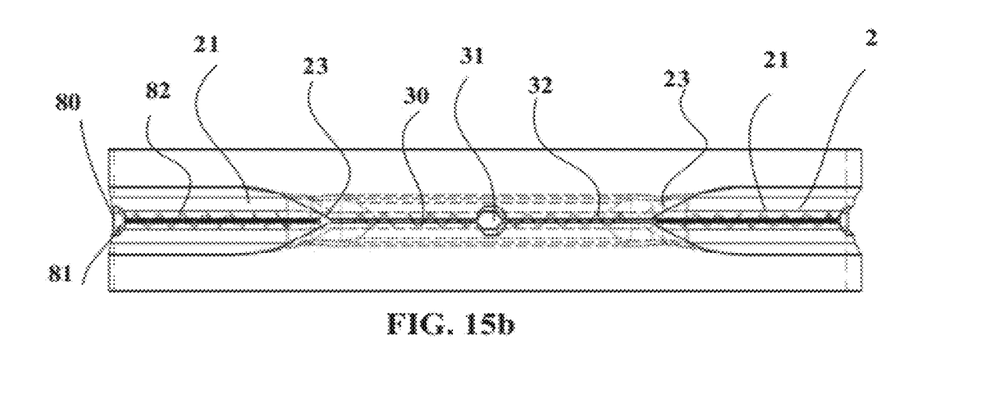

FIGS. 15a and 15b partially show a tread characterized in that each external cavity 21 opening onto the tread in the as-new condition is extended radially inwards by an incision 80 as far as the bottom of the wearing part of the tread. FIG. 15 shows a three-dimensional and perspective view of part of the tread according to the invention and comprising a groove 2 that is continuous and passes from the tread surface 11 in the as-new condition to a wearing layer situated on the inside of the tread. This groove comprises external cavities 21 connected by channels 23 to internal cavities 22. In this variant, the external cavities 21 are extended towards the inside of the tread by an incision 80, the walls of which are provided with means 82 that allow relative movement of the said walls with respect to one another to be blocked. Furthermore, it is locally provided with a widening 81 that combines with the incision 80. The provisions here are the same as those made with the incision 80 situated under the external cavity; blocking means 32 are provided on the incision 30 opening onto the tread surface, this incision connecting together two external cavities 21 and two connecting channels 23. FIG. 15b shows that same part of the tread in plan view, the surface of the drawing corresponding to the tread surface. This incision 30 that opens onto the tread surface further comprises a widening 31 at its middle.

The benefit of this variant is that it improves the flattening-out of the tread in the contact patch, thereby reducing resultant stress levels.

All the variants described hitherto show treads comprising two wearing layers through which the grooves according to the invention pass.

In the variants that follow, grooves according to the invention are depicted that delimit in fact three wearing layers within the thickness of the tread (this number of three is not in any way a limit but simply an additional numerical example to supplement the description of the invention).

In a first of these variants (FIG. 16), the internal and external cavities of the various levels are not superposed in the thickness of the tread: they are therefore offset from one another in the circumferential direction. In the second of these variants (FIG. 17), the internal cavities of the third wearing layer are superposed in the thickness with the external cavities, i.e. their position is more or less obtained by a translational movement of the external cavities through the thickness.

Figure 16:
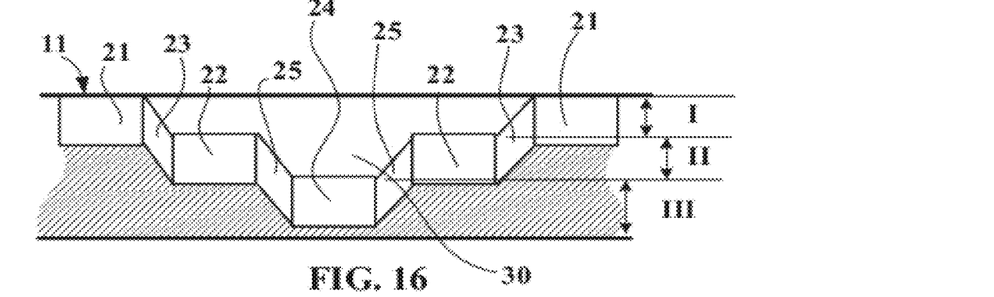
FIG. 16 shows a variant of tread comprising three wearing layers.

FIG. 16 shows a continuous groove according to the invention defining three successive wearing layers in the thickness of the tread. In this variant, the continuous groove 2 comprises external cavities 21 that are open in the initial condition onto the tread surface 11 and which are extended by connecting channels 23 to first internal cavities 22 situated in a second wearing layer. These first internal cavities 22 being themselves extended by connecting channels 25 to second internal cavities 24 situated in a third wearing layer III. In this variant shown in FIG. 16, radially underneath each external or internal cavity, there is no other internal cavity. Finally, this groove is extended radially towards the tread surface in the as-new condition by an incision 30 that makes such a groove easier to mold and to demold.

Figure 17:
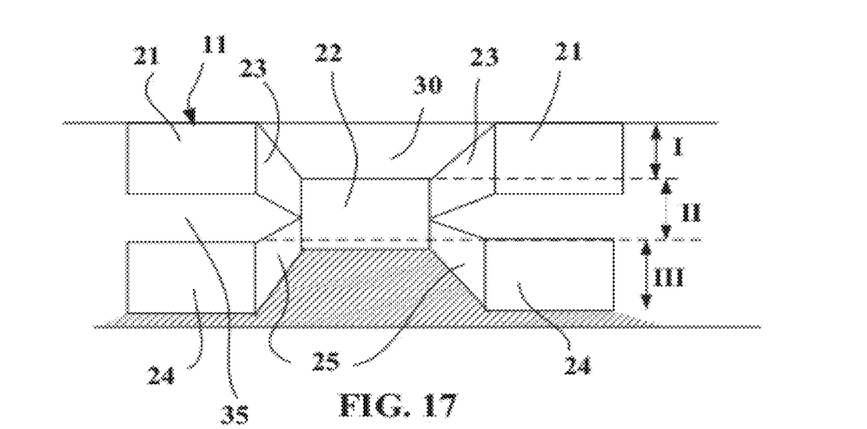
FIG. 17 shows another variant of tread comprising three wearing layers.

In another variant shown in FIG. 17, the tread comprises three wearing layers I, II, III and the groove depicted comprises internal cavities 24 of the third wearing layer III which in the thickness direction overlap with the external cavities 21 of the wearing layer I. In the variants shown in FIGS. 16 and 17, the various cavities are depicted as having substantially identical dimensions; it would of course be within the competence of the person skilled in the art to adapt the lengths of the various cavities according to their position or alternatively to adapt the respective volumes of these cavities without departing from the scope of the present invention. In this variant shown in FIG. 17, the internal cavities 22 of the second wearing layer II are connected to the third internal cavities 24 by connecting channels 25. To allow for molding and demolding, in addition to an incision 30 that opens onto the tread surface 11, there is provided an incision 35 connecting an external cavity 21 and the internal cavity 24 radially inside it, this incision 35 also connecting the connecting channels 23 and 25. Advantageously, these incisions 30 and 35 are provided with blocking means on the walls that delimit them.

Figure 18:
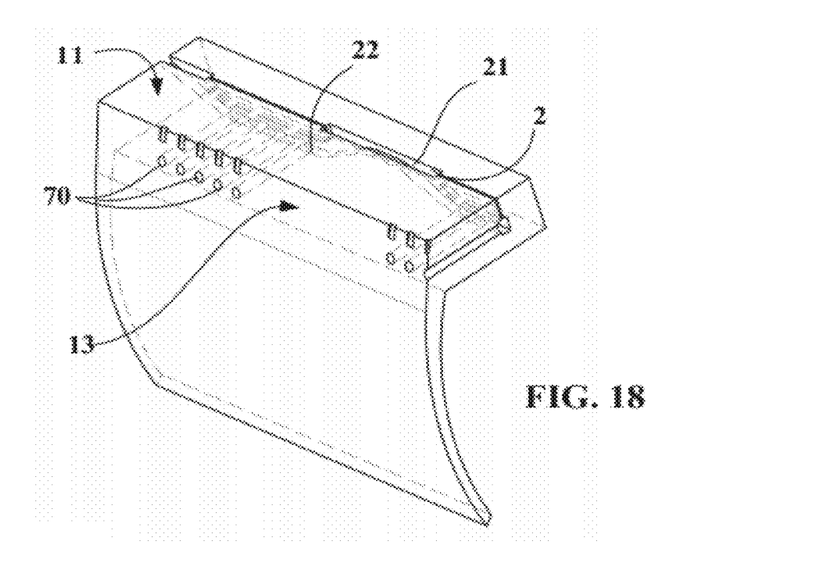
FIG. 18 shows a variant of a tread comprising, in addition to the continuous grooves formed of a succession of external and internal cavities, transverse channels opening onto the outside of the tread and connected to internal cavities of the continuous grooves.

In the variant shown in FIG. 18, a tread according to the invention is further provided with transverse channels 70 formed under the tread surface 11 of the tread in the as-new condition, these transverse channels being in appropriate number and opening onto longitudinal grooves 2 (i.e. grooves that are circumferential once the tread has been incorporated into a tire) and notably onto internal cavities 22 of the said grooves. These same transverse channels 70 are designed to open onto the external lateral walls 13 of the tread and thus further improve the water clearing capacity of the grooves 2 whatever the state of tread wear. Thus, once the external cavities 21 have completely disappeared through the wearing away of the first wearing layer of the tread, these transverse channels 70 form new transverse grooves and ensure the continuity of flow of water from the internal cavities 22 to the outside of the tread.

Of course, these transverse channels 70 may be connected to several internal cavities 22 of several grooves 2 in order to improve the flow of water from all the grooves thus connected following partial wear of the tread by thus creating a kind of network of greater or lesser complexity. It is also possible to connect these transverse channels 70 to continuous channels oriented circumferentially and formed entirely under the tread surface in the as-new condition (like those shown in FIGS. 6 to 8).

Moreover, these channels 70, by appearing on the tread surface after partial wear, increase the level of hollows at the surface and form further transverse edges that are of benefit in cutting into the layer of water present on the road surface in wet weather.

The invention is not restricted to the examples described and depicted and various modifications or additions can be made thereto without departing from the scope thereof.

In particular, the tread according to the invention may comprise a combination of at least one groove formed of a succession of external and internal cavities, these opening onto the tread surface only once said tread has been partially worn, and at least one additional groove that opens onto the tread surface in the as-new condition, this additional groove having a depth at least equal to that of those points of the grooves according to the invention that are nearest to the inside of the tread.

The internal cavities of various grooves according to the invention may be positioned at different levels within the thickness of a tread.

Further, while the present description has been entirely devoted to describing application to a tire intended to be fitted to a heavy goods vehicle, it should be understood that a tread comprising a tread pattern also forms part of the invention because such a tread is intended to be incorporated into a tire (either at the time of manufacture or when retreading the said tire).

In contrast with the invention, the cavities molded using the molding element described in the application (WO 02/38399), although they do indeed define different wearing layers, they do not exhibit any true continuity between the external cavities and the internal cavities because there is no connecting channel between them allowing water to flow when running on a wet road surface.

These tread patterns according to the invention, while offering satisfactory water clearance in the contact patch throughout the service life, allow a high overall rigidity to be maintained as compared with conventional tread patterns and thus make it possible to reduce the thickness of the tread for the same overall performance, and this is, of course, favorable in terms of energy consumption. That also allows the use of suitable rubber compounds.

The invention claimed is:

1. A tire tread of thickness E having a tread surface intended to come into contact with a road surface, comprising at least a first wearing layer and a second wearing layer within its thickness, comprising at least one continuous groove comprising a plurality of external cavities opening onto the tread surface in the as-new condition and a plurality of internal cavities placed radially and completely inside the tread surface in the as-new condition, the first wearing layer extending into the thickness of the tread as far as the radially innermost points of the external cavities, the second wearing layer and each other wearing layer extending into the thickness of the tread as far as the innermost points of the internal cavities of the wearing layer considered, the external cavities having a mean depth P1, a mean length L1 and a cross-sectional area S1, the internal cavities having a mean height P2, a mean length L2 and a cross-sectional area S2, wherein these external and internal cavities being such that: the difference between the mean lengths of the internal cavities and of the external cavities is at most equal to 20% of the longest mean length such that $0.80 \leq L1/L2 \leq 1.20$, the difference in the mean cross-sectional areas of the internal and external cavities is at most equal to 20% of the largest mean area such that $0.80 \leq S1/S2 \leq 1.20$, wherein each external cavity of a continuous groove is connected to at least two internal cavities of the same groove by connecting channels that provide continuity between said internal and said external cavities, further comprising a plurality of incisions opening onto the tread surface of the tread in the as-new condition, each of said incisions connecting two consecutive external cavities of one and the same groove and at least two connecting channels and at least one internal cavity, and wherein each connecting channel has two ends each having cross-sectional areas equal to the cross-sectional areas of the internal and external cavities that are connected by this connecting channel.

2. The tread according to claim 1, wherein the depths of each internal or external cavity is less than the total depth E of the tread.

3. The tread according to claim 1, wherein the distance a between each internal cavity and the tread surface of the tread in the as-new condition is greater than 25% of the total thickness E of the tread.

4. The tread according to claim 1, wherein each wearing layer has a thickness at most equal to 75% of the total thickness E of the tread.

5. The tread according to claim 1, wherein the internal cavities are arranged within the thickness of the tread to become open when the tread is partially worn by less than the total wearing away in the first wearing layer.

6. The tread according to claim 1, wherein each connecting channel connecting an external cavity to an internal cavity of one and the same continuous groove has a length Li of greater than zero and less than half the length L1 of the external cavities.

7. The tread according to claim 1, wherein the internal and external cavities of one and the same groove do not overlap in the direction of the thickness of the tread.

8. The tread according to claim 1, where at least two external cavities are each extended by a connecting channel, these connecting channels opening onto one and the same internal cavity.

9. The tread according to claim 1, wherein each external cavity of at least one continuous groove is extended at each of its ends by two connecting channels, these connecting channels each opening into separate internal cavities.

10. The tread according to claim 1, wherein it comprises additional cavities situated in a third wearing layer which extends the second wearing layer radially on the inside, these additional cavities being connected to the internal cavities of the second wearing layer by additional connecting channels.

11. The tread according to claim 1, wherein it comprises a first plurality of continuous grooves which are formed of a plurality of external and internal cavities connected by connecting channels, these grooves being oriented in a first direction, and in that it comprises a second plurality of continuous grooves which are formed of a plurality of external and internal cavities connected by connecting channels, the grooves of this second plurality of grooves being oriented in a second direction that intersects the first direction to form a network of criss-cross grooves, internal cavities of the second plurality of grooves being connected to internal cavities of the first plurality of grooves.

12. The tread according to claim 11, wherein the depths of each internal or external cavity is less than the total depth E of the tread.

13. The tread according to claim 11, wherein the distance a between each internal cavity and the tread surface of the tread in the as-new condition is greater than 25% of the total thickness E of the tread.

14. The tread according to claim 1, wherein it comprises a plurality of grooves which are formed of a plurality of external and internal cavities connected by connecting channels, these grooves being oriented in the longitudinal direction of the tread and being arranged in such a way that the first cavities that open onto the tread surface in the as-new condition are arranged offset from one another in the longitudinal direction, and in that the second cavities are also arranged offset from one another in the longitudinal direction.

15. The tread according to claim 14, wherein the depths of each internal or external cavity is less than the total depth E of the tread.

16. The tread according to claim 14, wherein the distance a between each internal cavity and the tread surface of the tread in the as-new condition is greater than 25% of the total thickness E of the tread.

17. The tread according to claim 1, wherein the continuous grooves formed of at least external cavities and internal cavities connected by connecting channels have a wavy overall shape.

18. The tread according to claim 1, wherein each external cavity that opens onto the tread in the as-new condition is extended radially towards the inside by an incision as far as the bottom of the tread, this incision also being connected to two connecting channels and to two internal cavities.

19. The tread according to claim 1, wherein it further comprises at least one channel that is entirely situated within the tread and designed to form a new groove by opening onto the tread surface after partial wear that is at most equal to the thickness of the first wearing layer.

20. The tread according to claim 19, wherein it further comprises means for placing at least one channel in communication with a plurality of internal cavities of a continuous groove.

21. The tread according to claim 1, wherein it comprises a plurality of channels opening onto the edges of the tread, these channels opening into at least one internal cavity of a continuous groove.

22. The tread according to claim 1, wherein the mean length of the external cavities of the circumferential grooves is between 25% and 75% of the mean length T of the contact patch of the tire measured under nominal conditions of use of the said tire.

* * * * *